July 15, 1924.
C. L. BEST
1,501,740
CLUTCH CONTROL MECHANISM
Filed Dec. 30, 1920    4 Sheets-Sheet 2
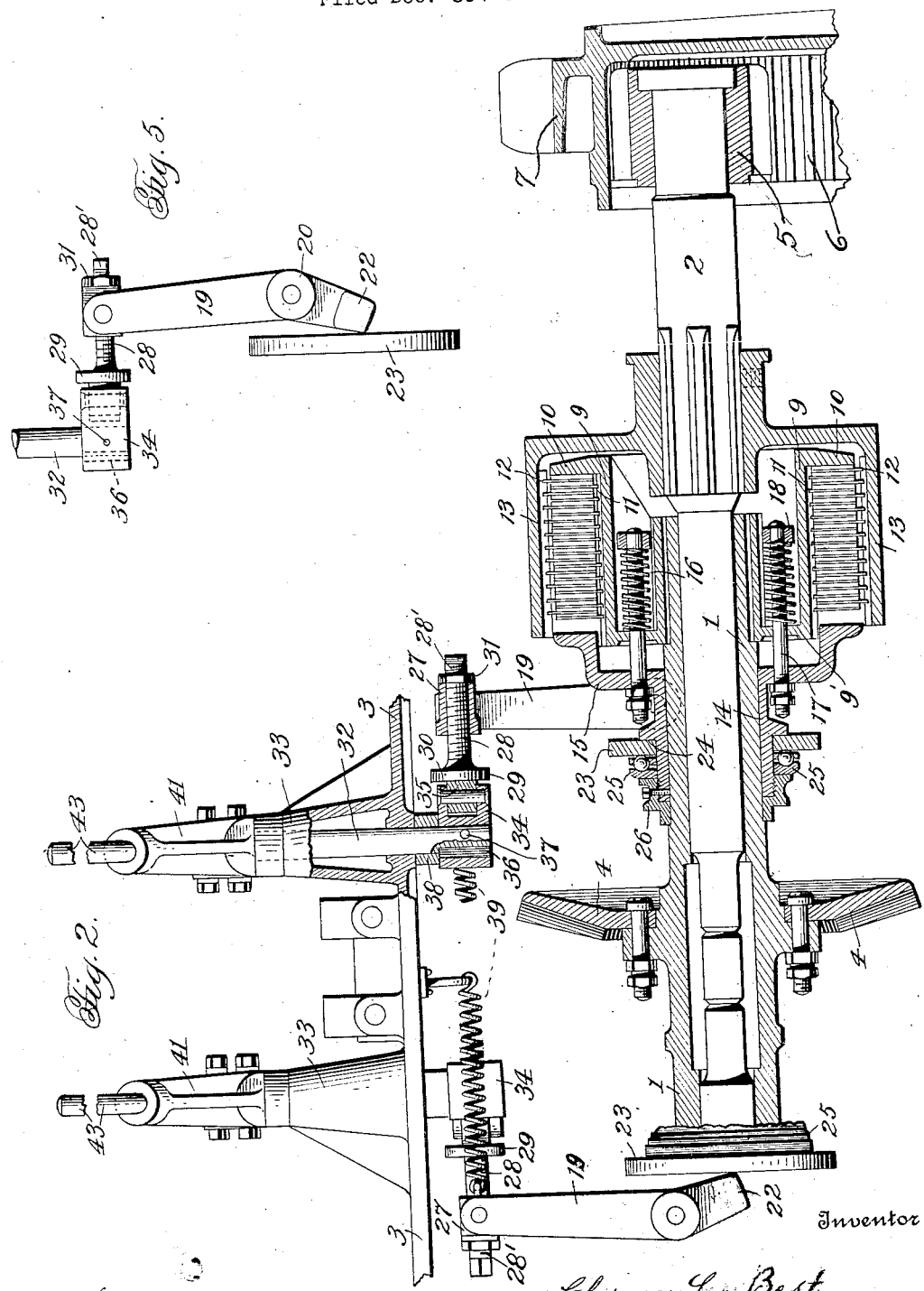
Inventor:
Clarence Leo Best,
By Milans & Milans
Attorneys
Witness:
Jas. E. Hutchinson

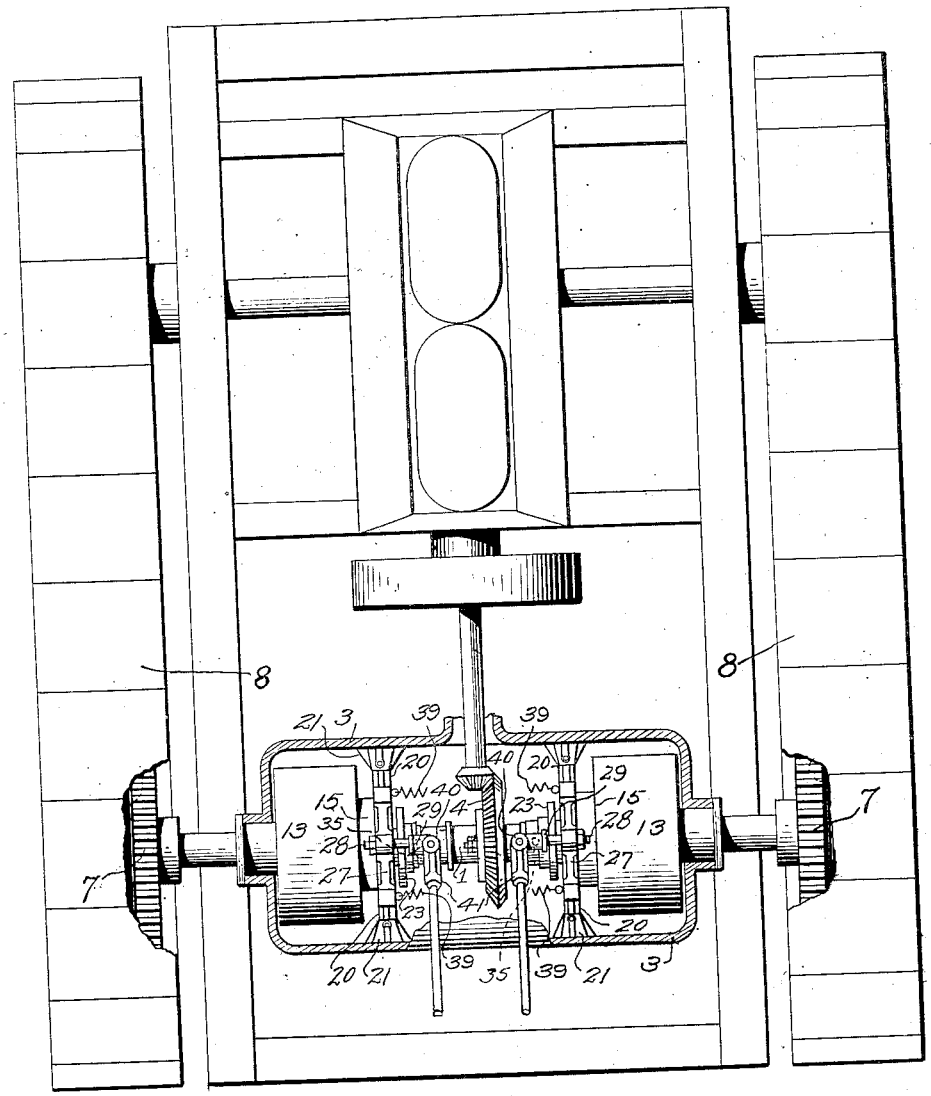

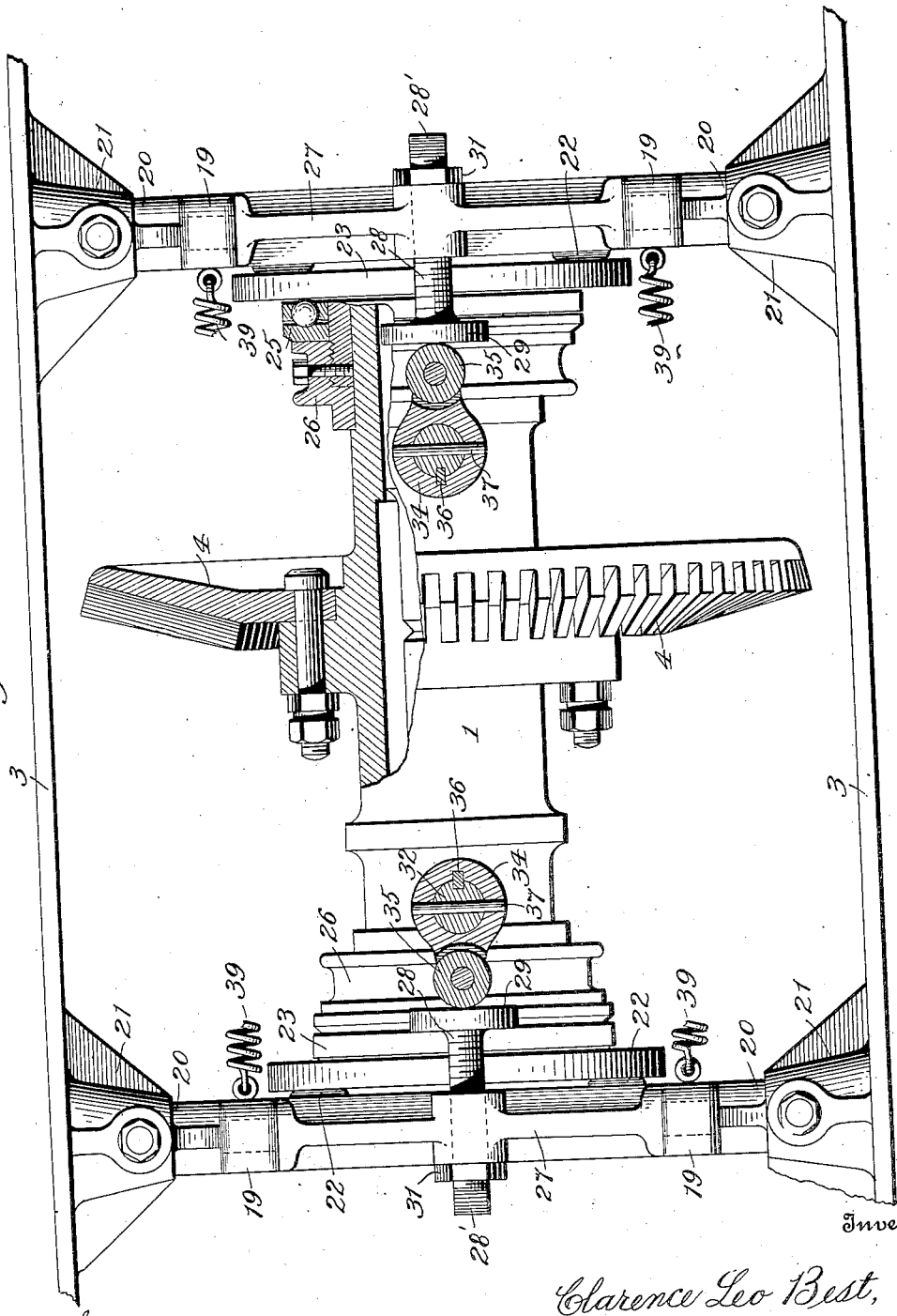

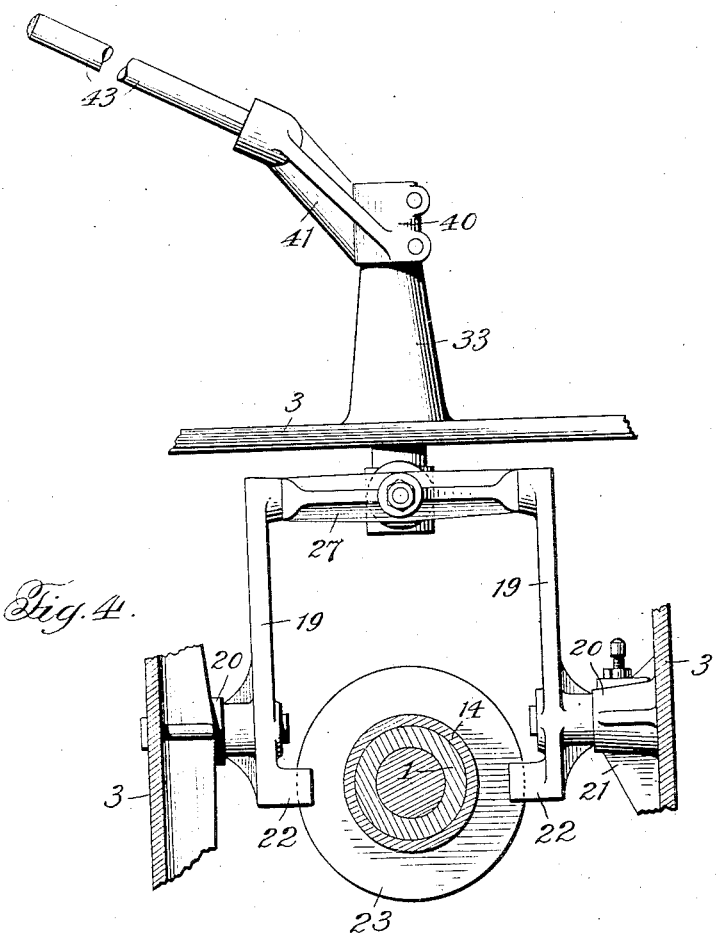

Patented July 15, 1924.

1,501,740

UNITED STATES PATENT OFFICE.

CLARENCE LEO BEST, OF SAN LEANDRO, CALIFORNIA, ASSIGNOR TO C. L. BEST GAS TRACTION COMPANY, OF SAN LEANDRO, CALIFORNIA, A CORPORATION OF CALIFORNIA.

CLUTCH-CONTROL MECHANISM.

Application filed December 30, 1920. Serial No. 434,053.

*To all whom it may concern:*

Be it known that I, CLARENCE LEO BEST, a citizen of the United States, residing at San Leandro, in the county of Alameda and State of California, have invented certain new and useful Improvements in Clutch-Control Mechanism, of which the following is a specification, reference being had therein to the accompanying drawing.

This invention relates to improvements in clutch control mechanism, and more especially to improved clutch releasing mechanism particularly adapted for traction engines.

The object of the invention is to provide improved clutch-releasing mechanism adapted to apply even pressure on either side of the thrust collar, or clutch-actuating disk member, whereby a more perfect control is afforded, and the clutch is operated to better advantage so that its period of service is materially increased.

An important novel characteristic of the invention resides in the special construction and arrangement of parts resulting in a simple compact structure that can be easily operated, and that will be strong and durable in use.

The invention, with other objects and advantages thereof, and the particular construction, combinations and arrangement of parts comprising the same, will be understood from the following detailed description when considered in connection with the accompanying drawings, forming part hereof and illustrating one embodiment of the invention.

In the drawings:—

Figure 1 is a plan view of an endless track type of tractor equipped with clutch releasing mechanism in accordance with the present invention.

Figure 2 is a longitudinal section, on an enlarged scale, with parts shown in side elevation, of part of the transmission and clutch-releasing mechanism illustrated in Fig. 1.

Fig. 3 is a top plan view, on an enlarged scale, of part of the clutch operating mechanism, with parts shown in section.

Fig. 4 is a detailed end elevation.

Fig. 5 is a detailed side elevation.

In the drawings, the invention is shown applied to the type of traction engine having endless tracks extending along opposite sides of the machine, and which is adapted to be steered by varying the speed of the endless tracks through the medium of friction clutches. The power transmission for the endless track devices shown in the drawings includes a transverse drive shaft 1 and driven shaft elements 2, 2 suitably mounted for rotation in a casing 3, the drive shaft 1 having a beveled pinion 4 through which it receives motion from the motor shaft, (not shown) and the driven shaft elements 2 extending from opposite ends of the drive shaft 1 and having pinions 5 at their outer ends meshing with gears 6 on sprockets 7 that engage the endless tracks 8. Any approved form of friction clutch may be employed for connecting the driven shaft elements 2 with the drive shaft 1, the construction shown being one of the well known types, each clutch comprising a head 9 secured on one end portion of the drive shaft 1. The head part 9 at one end is provided with an abutment flange 10, and mounted on the head to rotate therewith and for movement longitudinally therewith is a series of disks 11. Arranged in alternate relation with the series of disks 11 are a series of disks 12 connected with a part 13, which is secured to one of the driven shaft elements 2, the series of disks 12 being connected with the part 13 for adjustment longitudinally thereof and for rotation with said part. The series of disks 11, 12 are adapted to be forced into frictional engagement to connect the driven shaft elements 2 with the drive shaft 1 by a pressure member 14 having a hub 15 slidably mounted upon the driving shaft. 16 designates springs acting to normally maintain the series of disks in operative engagement, said springs being arranged on pins 17 extending inwardly from the hub 15 with their opposite ends engaging a part 9' of the head 9 and collars 18 on the inner ends of the pins 17. Separate clutch releasing means is provided for each of the clutches whereby the clutches can be independently controlled to vary the speed of the endless track devices.

The particular embodiment of my improved clutch-releasing mechanism, illustrated in the drawings, by way of example, includes a pair of levers 19 mounted intermediate their ends in bearings 20 carried by brackets 21 on the casing 3, said levers 19 being oppositely disposed at different sides of the drive shaft 1 with their lower portions extending adjacent to and provided with lateral extensions 22 to engage a thrust collar or actuating disk member 23 on the hub 15, the levers 19 being adapted to be swung together in a vertical plane to shift the thrust collar or actuating disk member 23 and the hub 15 to the position indicated in Fig. 2 of the drawings, the presser member 14 occupying a position out of engagement with the friction disks 11, 12. The thrust collar or actuating disk member 23 is shown seated on the hub 15 between a shoulder part 24 on the hub and an anti-friction bearing 25, a cap nut 26 on the end of the hub 15 serving to maintain the parts in position on the hub with the thrust collar or actuating disk member 23 free for rotation relative to the hub but fixed thereto as regards axial movement. The pair of levers 19 at their upper ends are connected together by a horizontally extending equalizer bar 27, the ends of the levers being pivotally connected to opposite ends of the equalizer bar, the latter being adapted to be moved bodily in a horizontal path. Intermediate its ends the equalizer bar is provided with a lateral extension 28 having a head 29 at the outer end thereof provided with a flat bearing face 30, the lateral extension 28 being shown, in this instance, as a separate part adjustably connected to the equalizer bar, said extension 28 being provided with a threaded shank 28', engaging a threaded socket of the equalizer bar 27, and provided with a clamp nut 31. 32 designates a vertical shaft supported for rotation in a tubular column 33 extending upwardly from the casing 3 and having on its lower end a cam adapted to cooperate with the head 29 on the equalizer bar 27. The cam consists of a head part 34 provided with an anti-friction roll 35 disposed at one side thereof eccentrically to the axis of rotation of the vertical shaft 32 and adapted to work against the flat bearing face 30 of the head 29. The head 34 is conveniently formed as a separate part, as shown, and fixedly secured to the shaft 32 by a key 36 and transverse pin 37. 38 designates a spacing collar between the cam head 34 and the lower face of the tubular column 33. Coiled springs 39, connected at opposite ends, respectively, with the casing 3 and opposite ends of the equalizer bar 27, serve to yieldably maintain the equalizer bar in a position with the head 29 of its lateral extension 28 in contact with the cam. The upper end of the vertical shaft 32 projects above the tubular column 33, and suitably secured thereto to rotate on the column is a hub 40 having an inclined extension 41 provided with a socket in which is seated an operating handle 43. The tubular columns 33 of the clutch-releasing mechanisms are preferably arranged a short distance apart, as shown, with the operating handles 43 extending rearwardly at an inclination within convenient reach from the operator's seat, not shown.

As will be understood, by swinging the operating handle 43 laterally the eccentric portion or anti-friction roller 35 of the cam working over the flat bearing face 30 of the head 29, will move the equalizer bar 27 horizontally, the levers 19 being swung together to force the thrust collar or actuating disk member 23 to inoperative position, as indicated in Fig. 2 of the drawings, the arrangement of parts being such that even pressure is applied upon either side of the thrust collar.

It will be noted that the special construction and arrangement of parts hereinbefore described provides for applying even pressure upon each side of the thrust collar or actuating disk member, the presser member for the friction disks being operated to better advantage so that a more perfect control and regulation of the frictional engagement of the disks to vary the speed of the endless track devices is obtained. The mechanism is of a simple compact nature that can be easily operated and will be durable and efficient in use.

What I claim is:—

1. The combination with a clutch having an axially movable actuating collar, and yieldable means acting to normally maintain the actuating collar in operative position, of releasing means including a pair of levers pivoted intermediate their ends, the levers being positioned with the end portions thereof at one side of their fulcrums arranged to engage the actuating collar at opposite sides of its central part, and adapted, when operated, to shift the actuating collar to inoperative position, an equalizer bar pivotally connected at opposite end portions with the end portions of the levers at the other side of their fulcrums, a rotary shaft disposed at right angles to the equalizer bar, and means on the shaft engaging a part on the equalizer bar intermediate the ends thereof to bodily shift the equalizer bar laterally of the shaft upon turning the same.

2. The combination with a clutch having an axially movable actuating collar, and yieldable means acting to normally maintain the actuating collar in operative position, of releasing means including a pair of levers pivoted intermediate their ends, the levers being positioned with the end portions thereof at one side of their fulcrums arranged to engage the actuating collar at opposite sides of its central part, and adapted when operated to shift the actuating collar to inoperative position, an equalizer bar pivotally connected at opposite end portions with the end portions of the levers at the other side of their fulcrums, said equalizer bar having a lateral extension provided with a bearing thereon, a rotary shaft disposed at right angles to the equalizer bar, and a cam on said shaft in the plane of the equalizer bar and adapted to cooperate with said bearing to bodily shift the equalizer bar laterally of the shaft when said shaft is turned.

3. The combination with a clutch having an axially movable actuating collar, and yieldable means acting to normally maintain the actuating collar in operative position, of releasing means including a pair of levers pivoted intermediate their ends, the levers being positioned with the end portions thereof at one side of their fulcrums arranged to engage the actuating collar at opposite sides of its central part, and adapted, when operated, to shift the actuating collar to inoperative position, an equalizer bar pivotally connected at opposite end portions with the end portions of the levers at the other side of their fulcrums, said equalizer bar having a bearing surface thereon intermediate its ends, a rotary shaft disposed at right angles to the equalizer bar, and a cam roller on said shaft adapted to cooperate with said bearing surface to bodily shift the equalizer bar laterally of the shaft when said shaft is turned.

4. The combination with a clutch having an axially movable actuating collar, and yieldable means acting to normally maintain the actuating collar in operative position, of releasing means including a support, a pair of levers pivoted intermediate their ends, the levers being positioned with the end portions thereof at one side of their fulcrums arranged to engage the actuating collar at opposite sides of its central part, and adapted, when operated, to shift the actuating collar to inoperative position, a bar pivotally connected at opposite end portions with the end portions of the levers at the other side of their fulcrums, said bar having a bearing surface thereon centrally of its ends, a rotary shaft disposed at right angles to the equalizer bar, having an eccentric portion to engage said bearing surface to shift the equalizer bar bodily upon rotation of the shaft, and a pair of coiled springs to maintain the bearing surface of the equalizer bar in engagement with said eccentric portion of the shaft, each of said springs being connected with one end of the equalizer bar and a part on the support.

5. The combination with a clutch having an axially movable actuating collar, and yieldable means acting to normally maintain the actuating collar in operative position, of releasing means including a pair of levers pivoted intermediate their ends, the levers being positioned with the end portions thereof at one side of their fulcrums arranged to engage the actuating collar at opposite sides of its central part, and adapted, when operated, to shift the actuating collar to inoperative position, an equalizer bar pivotally connected at opposite end portions with the end portions of the levers at the other side of their fulcrums, a rotary shaft disposed at right angles to the equalizer bar, a cam on the shaft to engage a part on the equalizer bar intermediate its ends to shift the equalizer bar bodily upon rotation of said shaft, and a spring acting in the plane of movement of the equalizer bar to maintain the part on the equalizer bar in engagement with the cam.

6. The combination with a clutch having an axially movable actuating collar member, and yieldable means acting to normally maintain the actuating collar in operative position, of releasing means including a pair of levers pivoted intermediate their ends to swing in vertical planes, the levers being positioned with their lower end portions engaging the actuating collar at opposite sides of its central part and adapted to shift the actuating collar to inoperative position, a horizontally extending equalizer bar pivotally connected at opposite ends with the upper end portions of the levers, a vertically disposed rotary shaft, and means between the shaft and equalizer bar acting to bodily shift the equalizer bar laterally upon rotation of the shaft.

7. The combination with a clutch having an axially movable actuating collar member, and yieldable means acting to normally maintain the actuating collar in operative position, of releasing means including a pair of levers pivoted intermediate their ends to swing in vertical planes, the levers being positioned with their lower end portions engaging the actuating collar at opposite sides of its central part and adapted to shift the actuating collar to inoperative position, a horizontally extending equalizer bar pivotally connected at opposite ends with the upper end portions of the levers, a vertically disposed rotary shaft, a handle at the upper part of the shaft, a cam part on the lower portion of the shaft adapted to cooperate with a part on the equalizer bar intermediate its ends to bodily shift the equalizer bar laterally upon rotation of said shaft.

8. The combination with a clutch having an axially movable actuating collar member, and yieldable means acting to normally maintain the actuating collar in operative position, of releasing means including a pair of levers pivoted intermediate their ends to swing in vertical planes, the levers being positioned with their lower end portions to engage the actuating collar at opposite sides of its central part, and adapted to shift the actuating collar to inoperative position, a horizontal equalizer bar pivotally connected at opposite ends with the upper end portions of the levers, said equalizer bar having a lateral extension with a bearing portion at the outer end thereof, a vertically disposed rotary shaft, a handle at the upper part of the shaft, and a cam on the lower portion of the shaft adapted to cooperate with said bearing portion to bodily shift the equalizer bar laterally upon rotation of the shaft.

9. The combination with a clutch having an axially movable actuating collar, and yieldable means acting to normally maintain the actuating collar in operative position, of releasing means including a pair of levers pivoted intermediate their ends at points at opposite sides of the central portion of the actuating collar, the levers being positioned with the end portions thereof at one side of their fulcrums arranged to engage the actuating collar at opposite sides of its central part, and adapted when operated to shift the actuating collar to inoperative position, an equalizer bar of a length substantially equal the diameter of the actuating collar extending parallel therewith and pivotally connected at its end portions with the end portions of the levers at the other side of their fulcrums, a rotary shaft disposed at right angles to the equalizer bar, and means on said shaft engaging a part on the equalizer bar centrally of the ends thereof to bodily shift the equalizer bar laterally of the shaft upon turning said shaft.

In testimony whereof I hereunto affix my signature in the presence of two witnesses.

CLARENCE LEO BEST.

Witnesses:
J. E. JONES,
R. C. FORCE.